United States Patent
Polan et al.

(10) Patent No.: US 6,993,001 B1
(45) Date of Patent: Jan. 31, 2006

(54) MODULAR BASE STATION WITH VARIABLE COMMUNICATION CAPACITY

(75) Inventors: Jeffrey Polan, Deer Park, NY (US); Stephen G. Dick, Nesconset, NY (US); Leonid Kazakevich, Plainview, NY (US); Fatih M. Ozluturk, Port Washington, NY (US); Robert T. Regis, Huntington, NY (US); Richard Turner, Oakdale, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

(21) Appl. No.: 09/646,371

(22) PCT Filed: Mar. 17, 1999
(Under 37 CFR 1.47)

(86) PCT No.: PCT/US99/05776

§ 371 (c)(1),
(2), (4) Date: Apr. 23, 2001

(87) PCT Pub. No.: WO99/48228

PCT Pub. Date: Sep. 23, 1999

(51) Int. Cl.
*H04Q 7/216* (2006.01)

(52) U.S. Cl. ..................................... 370/335; 455/524

(58) Field of Classification Search ............... 370/226, 370/227, 228, 220, 322, 328, 329, 330, 334, 370/335, 336, 337, 339, 341, 342, 350, 338, 370/340, 434, 441; 455/524, 525, 526

See application file for complete search history.

(56) References Cited

U.S. PATENT DOCUMENTS

| | | | |
|---|---|---|---|
| 5,584,049 A | | 12/1996 | Weaver, Jr. et al. |
| 5,655,003 A | * | 8/1997 | Erving et al. ............... 379/418 |
| 6,018,521 A | * | 1/2000 | Timbs et al. ................ 370/342 |
| 6,173,005 B1 | * | 1/2001 | Kotzin et al. ............... 375/141 |

(Continued)

OTHER PUBLICATIONS

Behague et al., Modularity and Flexibility: The Keys to Base Station System Configuration for the GSM Network, Nov. 13, 1991, pp. 161-168.

*Primary Examiner*—Phirin Sam
(74) *Attorney, Agent, or Firm*—Volpe & Koenig P.C.

(57) ABSTRACT

The present invention provides a base station architecture that is modular in configuration, lowering the initial cost of implementing a new CDMA telecommunication system for a defined geographical region while allowing for future capacity. The scalable architecture is assembled from a digital base station unit that is configured to support a plurality of simultaneous wireless calls connecting to a conventional public switched telephone network. For initial startup, two base station units are deployed for redundancy in case of a single failure. Additional base station units may be added when the need arises for extra traffic capacity. If sectorization is required, the base station units may be directionally oriented. Coupled to and remote from each base station unit are two amplified antenna modules that contain an omni-directional or an external directional antenna, a high power RF amplifier for transmitted frequencies and a low noise amplifier for received frequencies. A separate power supply module capable of supporting two base station units provides continued service in the event of a mains power outage.

13 Claims, 10 Drawing Sheets

U.S. PATENT DOCUMENTS

| | | | |
|---|---|---|---|
| 6,173,177 B1 * | 1/2001 | Lu et al. | 455/445 |
| 6,229,843 B1 * | 5/2001 | Lomp et al. | 375/150 |
| 6,275,712 B1 * | 8/2001 | Gray et al. | 455/522 |
| 6,400,966 B1 * | 6/2002 | Andersson et al. | 455/561 |
| 6,404,734 B1 * | 6/2002 | Stamatelakis et al. | 370/227 |
| 6,498,785 B1 * | 12/2002 | Derryberry et al. | 370/311 |
| 6,678,249 B2 * | 1/2004 | Toskala et al. | 370/236 |
| 6,804,264 B1 * | 10/2004 | Song | 370/500 |
| 2002/0123365 A1 * | 9/2002 | Thorson et al. | 455/524 |
| 2004/0229617 A1 * | 11/2004 | Sato | 455/437 |

* cited by examiner

MODULAR BASE STATION WITH VARIABLE COMMUNICATION CAPACITY

BACKGROUND OF THE INVENTION

1. Field of the Invention

The present invention relates to communication systems. More specifically, the invention relates to a communication system using a code division multiple access air interface between a plurality of individual subscribers distributed within a cellular community and a plurality of small capacity base stations, some colocated per cell to increase operational economy in proportion to the number of subscribers.

2. Description of the Prior Art

Advanced cellular communication makes use of a state of the art technique known as code division multiplexing, or more commonly, as code divisional multiple access or CDMA. An example prior art communication system is shown in FIG. 1.

CDMA is a communication technique in which data is transmitted with a broadened band (spread spectrum) by modulating the data to be transmitted with a pseudo-noise signal. The data signal to be transmitted may have a bandwidth of only a few thousand Hertz distributed over a frequency band that may be several million Hertz wide. The communication channel is being used simultaneously by m independent subchannels. For each subchannel, all other subchannels appear as noise.

As shown, a single subchannel of a given bandwidth is mixed with a unique spreading code which repeats a predetermined pattern generated by a wide bandwidth, pseudo-noise (pn) sequence generator. These unique user spreading codes are typically orthogonal to one another such that the cross-correlation between the spreading codes is approximately zero. The data signal is modulated with the pn sequence producing a digital spread spectrum signal. A carrier signal is then modulated with the digital spread spectrum signal establishing a forward-link and transmitted. A receiver demodulates the transmission extracting the digital spread spectrum signal. The transmitted data is reproduced after correlation with the matching pn sequence. When the spreading codes are orthogonal to one another, the received signal can be correlated with a particular user signal related to the particular spreading code such that only the desired user signal related to the particular spreading code is enhanced while the other signals for all other users are not enhanced. The same process is repeated to establish a reverse-link.

If a coherent modulation technique such as phase shift keying or PSK is used for a plurality of subscribers, whether stationary or mobile, a global pilot is continuously transmitted by the base station for synchronizing with the subscribers. The subscriber units are synchronizing with the base station at all times and use the pilot signal information to estimate channel phase and magnitude parameters. For the reverse-link, a common pilot signal is not feasible. Typically, only non-coherent detection techniques are suitable to establish reverse-link communications. For initial acquisition by the base station to establish a reverse-link, a subscriber transmits a random access packet over a predetermined random access channel (RACH).

Most prior art CDMA communications systems employed to date, whether communicating with fixed or mobile subscribers that include personal communication services (PCS), have been designed for immediate large scale traffic considerations. A communication system specification proposed by a service provider establishes a required number of base stations which determine the region of communication coverage. The specification geographically locates each cell and establishes a traffic capacity that determines the number of anticipated subscribers per cell including fixed and mobile. The maximum capacity of communication traffic in each cell is typically fixed by this design.

Prior art CDMA communication systems have been designed and sized to immediately handle many simultaneous communications and are therefore costly start-up installations for the service provider. These systems have not addressed the need for a flexible base station architecture that permits a cost effective, small scale initial installation that can accommodate future subscriber growth.

Accordingly, the object of the present invention is to decrease the initial installation cost of a CDMA communication system while allowing future expansion when the need arises.

SUMMARY OF THE INVENTION

The present invention provides a base station architecture that is modular in configuration, lowering the initial cost of implementing a new CDMA telecommunication system for a defined geographical region while allowing for future capacity. The scalable architecture is assembled from a digital base station unit that is configured to support a plurality of simultaneous wireless calls connecting to a conventional public switched telephone network. For initial startup, two base station units are deployed for redundancy in case of a single failure. Additional base station units may be added when the need arises for extra traffic capacity. If sectorization is required, the base station units may be directionally oriented. Coupled to and remote from each base station unit are two amplified antenna modules that contain an omni-directional or an external directional antenna, a high power RF amplifier for transmitted frequencies and a low noise amplifier for received frequencies. A separate power supply module capable of supporting two base station units provides continued service in the event of a mains power outage.

The present invention supports both small and large size sectors or omni-cells with an architecture that allows for easy growth to support expanding traffic capacity without incurring a large initial fixed cost.

Accordingly, it is an object of the present invention to allow for easy expansion when subscriber communication traffic increases.

Other advantages may become apparent to those skilled in the art after reading the detailed description of the preferred embodiment.

DESCRIPTION OF THE PREFERRED EMBODIMENT

The present invention is described with reference to the drawings figures where like numerals represent like elements throughout.

Figure 1:
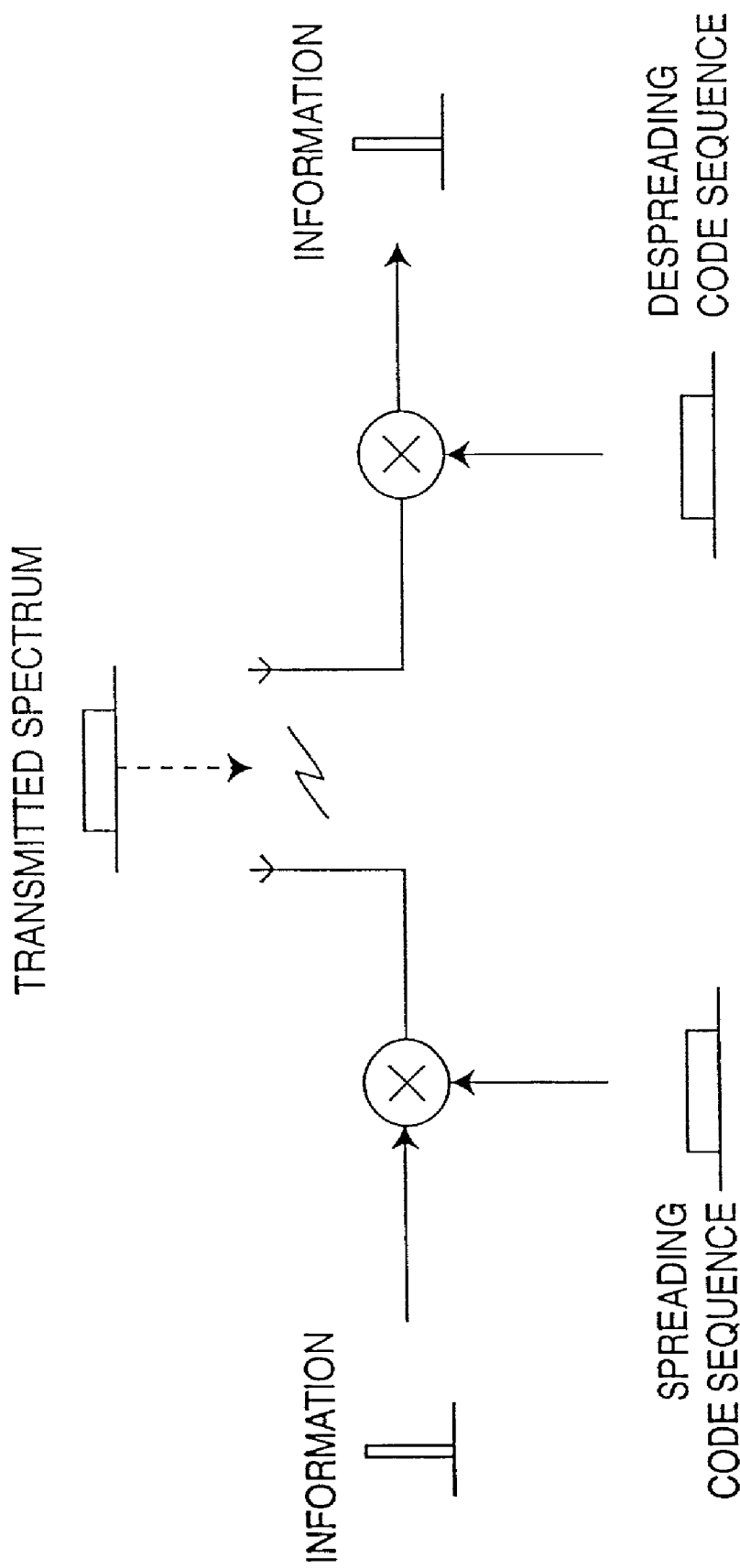
FIG. 1 is a simplified block diagram of a typical, prior art, CDMA communication system.
Figure 2:
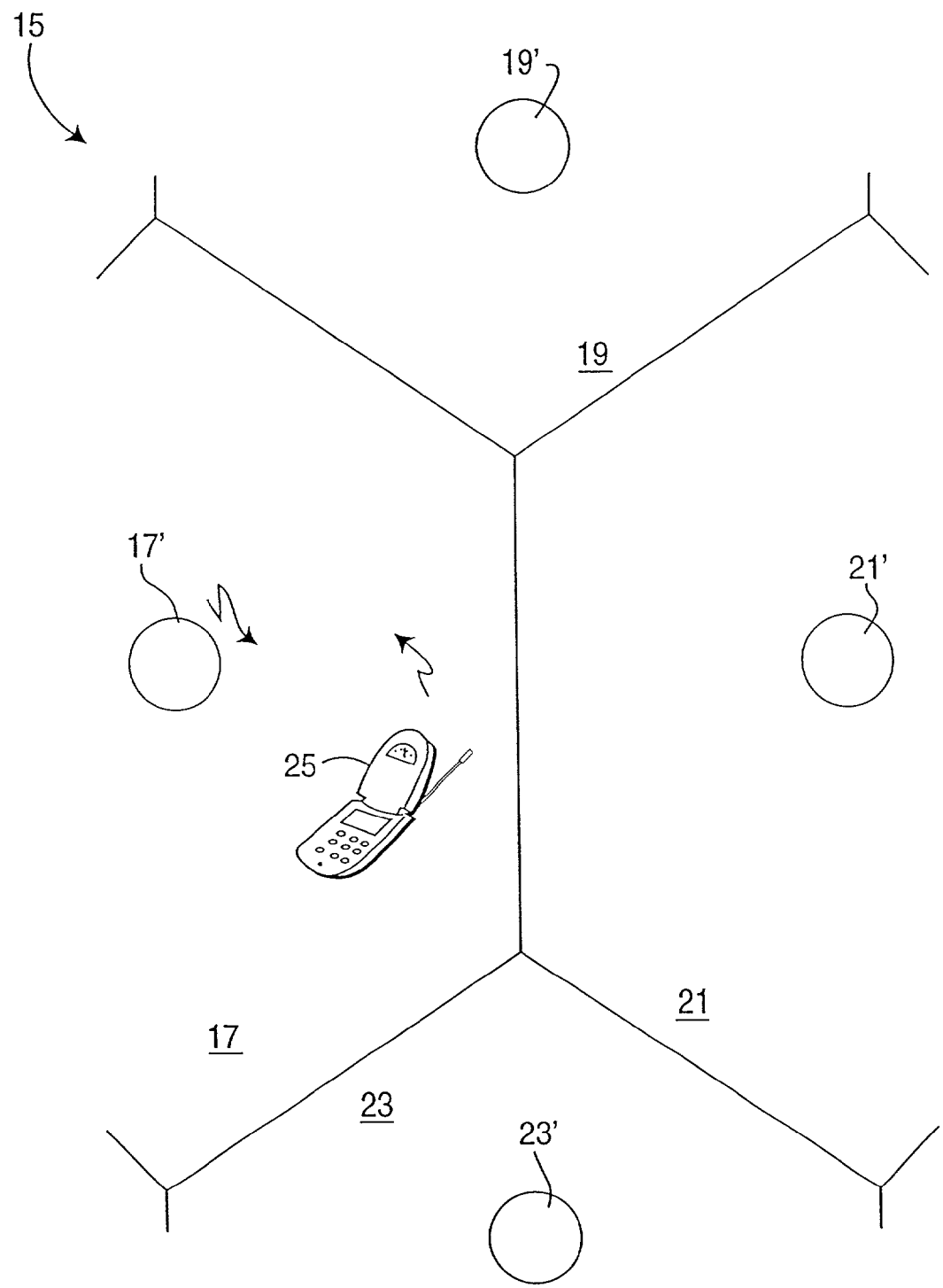
FIG. 2 is a communication network embodiment of the present invention.

A system diagram illustrating a CDMA communication system 15 employing scalable modular base stations is shown in FIG. 2. Four cells 17, 19, 21, 23 of a multi-cellular telecommunication system are shown with respect to their base station transceivers 17N, 19N, 21N, 23N. One subscriber unit 25 is shown within one cell. A plurality of individual forward and reverse signals are transmitted in respective regions of the common CDMA frequency bandwidth between the base station 17' and subscriber unit 25.

The base station units or BSUs employed in the scalable modular base station enable a scalable configuration proportional to the number of subscribers 25. As an example, 150 subscribers whose average utilization during busy period is less than 10 percent, would require a base station unit with 16 modems supporting up to 15 simultaneous calls. For redundancy in case of a single failure, the scalable modular base station requires two colocated BSUs (having twice the minimum capacity) to serve the same communicating population to provide limited service in the event that one BSU failed.

The colocated modular approach supports additional growth, expanding beyond the two BSUs as the need arises. Each BSU is omnidirectional or may be configured with a directional antenna for sectoring. Likewise, as growth in a particular area of the cell arises, BSUs favoring a specified direction would be deployed to service the higher density sector. Each BSU connects to the public switched telephone network or PSTN via any one of several standard or proprietary terrestrial interfaces.

To support fault tolerance, it is necessary that each subscriber unit 25 be capable of communicating with a minimum of two BSUs. If 1 to n BSUs share coverage of a given cell area or sector, each subscriber unit 25 can communicate with any one of the n BSUs. In a presently preferred embodiment, n=6. Each subscriber unit 25 with the cell selects the BSU having the smallest path loss.

The scalable modular base station for a CDMA air interface requires a set of global channels to support operation. The global pilot supports initial acquisition by the subscriber and provides channel estimation for coherent processing. One or more global broadcast channels provide signaling information. Each BSU requires its own set of global channels. However, global channels use air capacity and is therefore costly to assign a set of full strength global channels for each BSU.

The scalable modular base station supports subscriber operation on battery standby during power outages. To do so requires a sleep mode where the subscriber unit 25 wakes up briefly, for example, once per second, to check for paging messages indicating an incoming call. However, when a subscriber's waking period is short, a base station's global pilot must be strong. The pilot strength must be greater than the level needed to simply provide a reference signal for coherent demodulation and channel estimation.

Each subscriber unit 25 is assigned to a set of colocated BSUs and alternately acquires each one in sequence, once per wake up period. The subscriber unit 25 acquires a first BSU on even seconds and a second BSU on odd seconds. If more than two BSUs are deployed, the subscriber acquires each BSU in sequence returning to the first for the next interval. In direct correspondence, each BSU transmits its pilot at alternating high and low power levels in dependence upon how many BSUs are deployed in the particular cell. Only one BSU transmits a high power global pilot at a given time. The BSUs are preprogrammed to specify which BSU is selected to send its pilot at high power and which is selected to send its pilot at low power.

All colocated BSUs of the same group are preprogrammed to store two indices; Igroup, which designates the identity of the group and Iunit, which designates the identity of the BSU within the group. Each subscriber unit 25 is assigned to a group, designated by Igroup. For fixed wireless access, this can be designated and entered during registration. For mobile subscribers, this can be derived by the subscriber unit 25 testing the relative strengths of BSU pilots and selecting the strongest as is used for roaming and handoff.

Once a subscriber unit 25 is associated with an Igroup, when synchronizing it accesses each member BSU of the group; Igroup, Iunit. Each time a subscriber unit 25 wakes up, it re-synchronizes with the pilot signal of the BSU (Iunit) transmitting the pilot at full power. The subscriber unit 25 derives the identity of the BSU based on time of day. Other subscriber units 25 associated with Igroup use the same method to specify which BSU is transmitting the strong pilot and broadcast channels. The effect is that all subscriber units 25 wake up and listen to the pilot and broadcast channels of the respective BSU transmitting at full power.

Each subscriber unit 25 receives the time of day from the PSTN. Network Operations and Maintenance functions provide messages which contain the time of day accurate to within 2 milliseconds. The messages are sent over the terrestrial link from the O&M function to each base station location and on to each BSU. Each BSU sends the time of day once over a slow broadcast channel. The subscriber unit 25 uses the message to synchronize its internal clock.

The time of day (tod) is converted to the identity of one BSU by using modular arithmetic $$Iunit = tod\ mod(n) \qquad \text{Equation 1}$$

where n is the stored value of the number of BSUs within Igroup. Both the BSU and all subscribers of Igroup know which BSU will be broadcasting at a specific time. When awakened, the subscriber unit 25 synchronizes time, reads the messages in its assigned time slot and measures the strength of the received pilot signal from the transmitting BSU. The subscriber unit 25 also measures the activity of the transmitting BSU.

The BSUs indicate the amount of capacity over the slow or fast broadcast channels. The slow broadcast channel indicates the amount of activity. The fast broadcast channel indicates activity through the use of traffic lights. Each traffic channel has an indicator called a traffic light resident on the fast broadcast channel which tells the subscriber unit 25 availability. Using the traffic lights as capacity indication, the subscriber unit 25 can derive which of the BSUs is least busy. All BSUs send paging messages. Upon identifying a page, the subscriber unit 25 will select the optimal BSU to connect with. The choice is determined on information such as level of usage and signal strength. The subscriber unit 25 will select the BSU which is associated with the strongest received pilot level unless that BSU is near maximum capacity determined by the traffic lights and/or the level of activity.

Since a BSU pilot is always programmed to be strong when a subscriber unit 25 wakes-up, the wake up time can be minimized. The strong pilot is required to simplify reacquisition by a subscriber unit 25 after wake-up. Thereafter, the subscriber unit 25 returns to low duty cycle and low battery consumption. The lower level pilot, with a signal power level approximately ½ of a normal traffic channel is transmitted at all times. Since each BSU is transmitting a global pilot at a lower power level when not supporting the wake-up process, each BSU supports coherent demodulation of established traffic channels at all times with a negligible affect on total air capacity.

For each wake-up cycle, the subscriber units 25 derive the BSU of choice from the Igroup, based on the time of day, and load the pn spreading codes corresponding to the global pilot and broadcast channels of the BSU chosen. The subscriber unit 25 then measures the relative strength of the received pilot signal, once per wake-up cycle and stores the relative level and performs an average of the most recent set of measurements for each of the candidate BSUs.

The subscriber unit 25 reads the amount of traffic currently supported by the given BSU if that information is transmitted on the slow broadcast channel or, observes and stores the number of red traffic lights on each BSU maintaining a short term average.

The subscriber unit 25 performs a selection process to identify a favored BSU. When a subscriber unit 25 requests an access channel, the preferred BSU is selected loading the appropriate codes and initiating a normal ramp-up process.

The BSUs maintain a time of day clock, reading the time at either once per millisecond or once per subepoch. The time of day is used to identify its global channel transmit period. Thereafter, its respective global channels are allocated and the transmit power is set to the desired level. Traffic messages and signals normally sent by the BSU over its broadcast channels proceed. When synchronization between the subscriber unit 25 and a BSU is complete, the subscriber unit 25 transmits symbol length short code while gradually increasing the transmit power level. The subscriber unit 25 monitors the BSU for an acknowledgment signal, which acts as a traffic light to determine if the BSU receives and acknowledges the short code.

The subscriber unit 25 process for BSU selection includes keeping a data base in memory with the following information:

RelPower(Iunit); where Iunit=1 to n
   where RelPower is the relative power of BSU (Iunit) and there are n units total.
Activity(Iunit); where Iunit=1 to n For each wake up cycle:
RelPower(Iunit) is maintained as a low pass filtered estimate of the received measured pilot power:

$$RelPower(Iunit)=RelPower(Iunit)+\alpha(\text{measured pilot power}-RelPower) \quad \text{Equation 2}$$

Activity(Iunit)=level of traffic as sent on broadcast channel, or

Activity(Iunit)=number of red traffic lights counted on current wake up cycle for the BSU When a subscriber unit 25 attempts an access request, the BSU assignment is determined as a function of relative received pilot power level and relative activity. For example, the subscriber unit 25 can select the BSU with the strongest received pilot provided its activity is below a threshold. As one skilled in this art would recognize, other performance criteria could be used.

Figure 3:
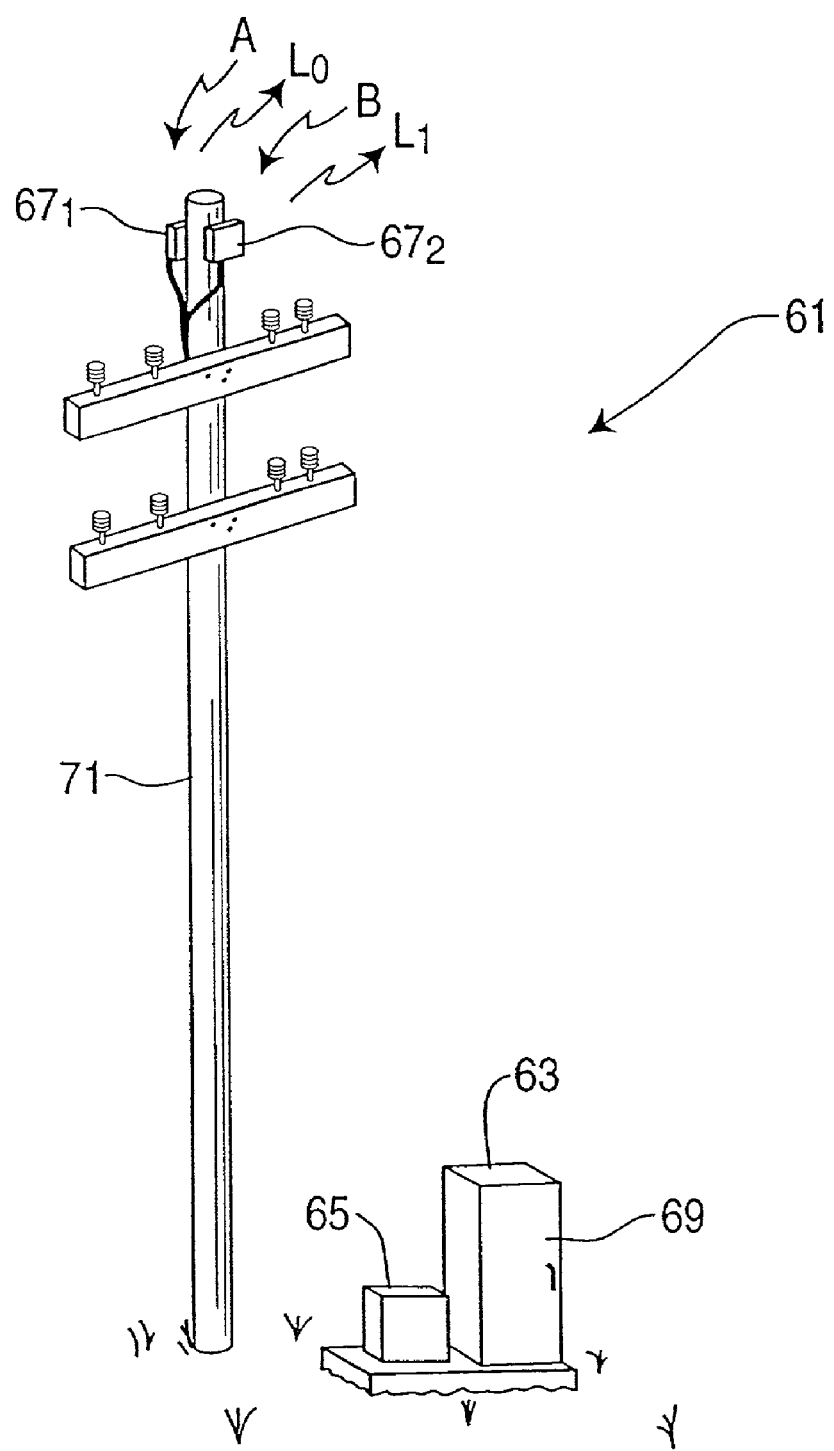
FIG. 3 is a physical installation of a scalable modular base station.
Figure 4:
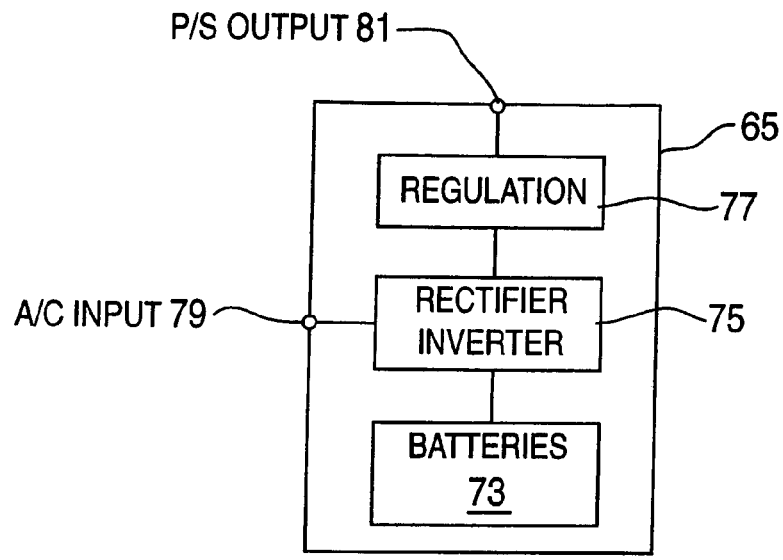
FIG. 4 is a block diagram of a power supply for the scalable modular base station.
Figure 5:
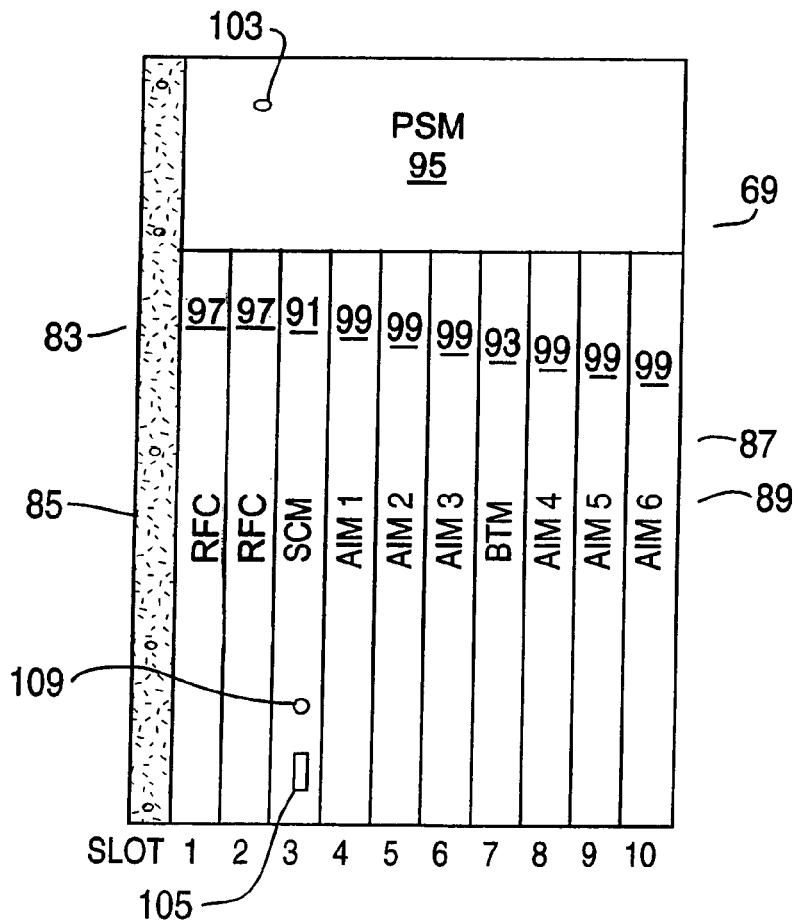
FIG. 5 is a block diagram of a base station unit.
Figure 6:
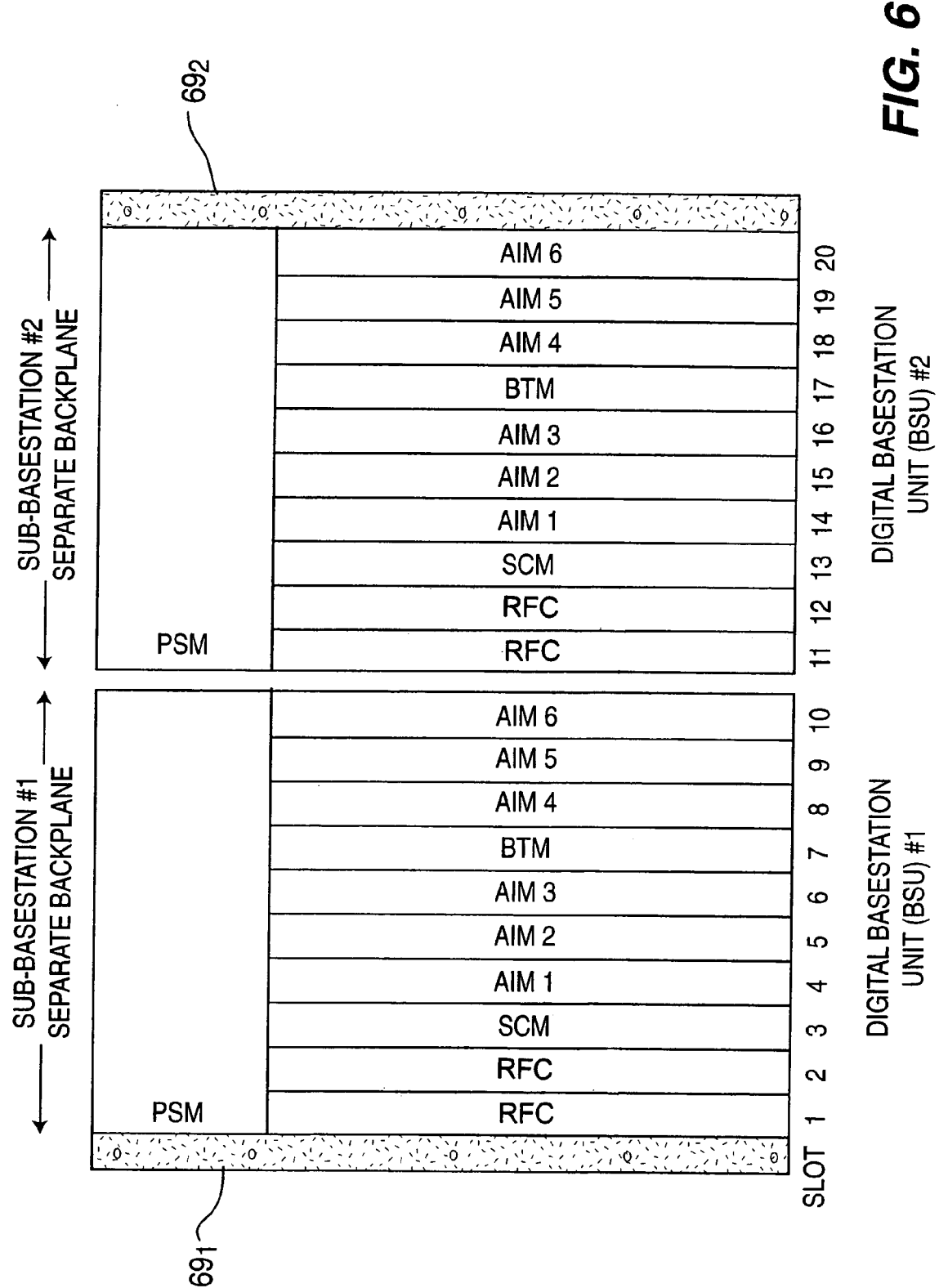
FIG. 6 is a block diagram of two base station units.

The architecture and physical implementation for an example scalable modular base station 61 is shown in FIGS. 3, 4 and 5. The physical configuration for a base station 61 includes four separate enclosures: 1) a digital base station cabinet (DBC) 63; 2) a base station power supply module (BSPM) 65; and 3&4) two amplified antenna modules (AAM) 67₁, 67₂.

The base station cabinet 63 is an environmental enclosure which supports indoor or outdoor installation. The DBC 63 houses BSUs 69. The AAMs 67₁, 67₂ are mounted remote from the BSU 69, at a high elevation 71. Each BSU 69 requires two AAMs 67.

The BSPM 65 is shown in FIG. 4 and includes storage batteries 73, an ac/dc rectifier/inverter 75 and active voltage regulation 77. The BSPM 65 receives external power 79 from a 120/220 Vac mains power supply (not shown) and provides an isolated filtered output 81 to a DBC 63. Operation is similar to an uninterruptable power supply commonly known in the electronic arts. The batteries 73 provide up to four hours of continuous operation for one DBC 63 (two BSUs 69) configured for maximum capacity upon a mains power supply fault. Power is coupled via an umbilical to the respective BSU(s) 69. Since a DBC 63 may be located outdoors, the BPSM 65 is remote and environmentally sealed as well.

As shown in FIG. 5, the BSU 69 is a card rack 83 assembly having a common communication backplane 85 using a high speed parallel data bus 87 and a power distribution bus 89. The removable card complement for a base station 61 requires: 1) one system control module (SCM) 91; 2) one baseband transceiver module (BTM) 93; 3) one power supply module (PSM) 95; 4) two radio frequency control modules (RFC) 97; and 5) up to six air interface modules (AIM) 99 each having 16 transmit/receive modems (not shown). The PSM 95 couples the external BSPM 65 with a BSU 69 via male/female connectors (not shown) and provides local power supply regulation and filtering.

The SCM 91 contains a systems level microprocessor with collateral memory for controlling transmit/receive modem selection and coordinating component failure with another colocated BSU 69. Each SCM 91 includes a communication bus port 105 to allow communication over a data transport such as Ethernet® E1 line between colocated BSUs 69. The communication bus also allows external interrogation of each SCM 91 for up-loading or down-loading operational software or operation parameters. SCM 91 identification is accomplished via DIP switches or the like. External connections to the modular base station are made via F-ports 109 on this module and can support copper HDLC lines or fiber optic lines for receiving a POTS E1 line 111 which may carry up to 60 EDPCM calls.

The BTM 93 coordinates transmission by combining the analog baseband signals from active transmit AIMs 99 and distributes received communication signals to active receive AIMs 99. If the required capacity of an installation requires two BSUs 69, each BTM 93 per BSU 69 is coupled with each other.

The RFC 97 accepts the signal from a BTM 93 and upconverts 113 for transmission $L_0$, $L_1$. Likewise, the RFC 97 downconverts 115 received signals A, B for the BTM 93. Digital to analog conversion along with transmit 117 and receive 119 selectable digital delays take place in the RFC 97.

The AAM 67 encloses an omnidirectional printed circuit antenna 121 for transmission $L_{0, L1}$ and reception A, B of communication signals. A directional antenna may be employed if cell sectorization is a design requirement. The A directional antenna may be configured to support three and six sector operation. High 125 and low 127 power duplexers separate the transmitting $L_0$, $L_1$ and receiving A, B frequencies with separate amplifiers 129, 131 located in between for each respective frequency direction. Remote location of the transmitting 129 and receiving 131 amplifiers allow the use of low cost coaxial cable 133 between a RFC 97 and an AAM 67. A dc potential is impressed by the BTM 93 on the coaxial cable to power both amplifiers 129, 131.

Each AIM 99 includes up to 16 individual modems (not shown) for either transmission $L_0$, $L_1$ or reception A, B depending on assignment. A BSU 69 can be configured with a minimum of one up to a complement of six AIMs 99. Each AIM 99 contains 16 modems (15 simultaneous calls plus one broadcast modem). Depending upon traffic need, a maximum of six AIMs 99 can support up to 98 PCM or 180 LD-CELP calls.

The modular architecture 61 can support both small and large size sectors in a cell or an omni cell. Each BSU 69 is initially configured to support the number of calls and the specific type of service required depending upon the number of modems 135 (AIMs 99) installed. A minimum of two colocated BSUs 69 are required for redundant operation at a designated cell location. Since each BSU 69 has no internal redundancy if a single failure occurs, redundancy is achieved by allowing any fixed or mobile subscriber unit 25 to communicate with a colocated BSU 69 at the cell base station site. Redundancy is achieved by allowing any subscriber 25 to associate with any BSU 69 in a sector. If a BSU 69 should fail, capacity is lost, but a subscriber 25 can access another colocated BSU 69. A BSU 69 in a sector can be configured with excess capacity thereby providing a cushion in the unlikely event of a failure in that sector.

Each BSU 69 communicates independently with an assigned subscriber. As previously described, to accomplish this function each BSU 69 must have unique global channels for the global pilot, the fast broadcast channel and the slow broadcast channel.

The unique global pilot allows each subscriber 25 to synchronize with an individual BSU 69. The fast broadcast channel provides a traffic light function to the subscriber 25 informing him on BSU 69 availability and power ramp-up status from the respective BSU 69. The slow broadcast channel transports activity and paging information from the BSU 69 to the subscriber 25 for personal communication services (PCS).

As discussed above, if each BSU 69 global pilot signal is transmitted as in the prior art, sector or cell capacity availability would be severely affected due to the effect on air capacity. Unlike the prior art, each BSU 69 continuously transmits a weak global pilot signal approximately one half of the signal strength of a standard 32 kbps POTS traffic channel.

Each colocated BSU 69 recognizes and handshakes with other colocated BSUs 69 via the external system communication E1 line, coupling each BSU 69 BTM 93/SCM 91 with each other to coordinate the transmitting of the global pilot signals from one base station location. The E1 line interrogates each of the colocated BSUs 69 to coordinate the transmission of each of their unique global pilot signals. Each BSU 69 increases its global pilot signal level to a normal traffic channel level for a finite period of time. Each other BSU 69 continues transmitting their respective global pilot signals but at the weaker power level. This method insures that only one BSU 69 is transmitting its respective global pilot signal at a high power level.

The fast and slow 44 broadcast channels are transmitted from each BSU 69 at a nominal power level. If many BSUs 69 are colocated, the total air capacity overhead required to transmit the fast and slow broadcast channels, global pilot signals 137 and one strong global pilot signal 137 is increased when compared to one base station. However, the maximum capacity of 98 PCM calls per sector or cell is not affected since the overhead occurs only in the forward-link. The reverse-link is more problematic because of the assigned pilots from each subscriber limiting air capacity.

The power modulation of each pilot signal from a BSU 69 benefits the acquisition of subscribers 25. Since each BSU 69 broadcasts its pilot signal at the normal power level for a finite period of time, a subscriber 25 will most likely acquire the strongest pilot signal. If the BSU 69 at maximum power has all of its modems active (either transmitting or receiving), the subscriber unit 25 will pass over and attempt to acquire the next consecutive full power pilot signal.

Each BSU 69 requires unique codes to transmit the unique global pilot signals. A common seed is provided to all BSUs 69 for the each pilot signal, but unique identities are manufactured by offsetting the code by z-thousand chips to effectively produce a unique code for each BSU 69. From a single, common global pilot seed, a plurality of unique codes will be produced for each BSU 69.

Referring to FIGS. 6 and 7A through 7D, a scalable modular base station 61 installation includes at least one, two (as-shown), or a plurality of BSUs if required.

The adjustable receive delay units 119 located in associated with each AAM 67 shift the time-of-arrival for the received signals A, B, C, D. A single BSU 69 installation processes two adjustable time of arrivals 119 where each is summed 145 yielding a signal 147 that will have 2 copies of the received signal with different time delays.

A modular base station 61 that is sectorized or is configured for a large number of subscribers 25 will have a plurality of BSUs 69. All AAMs 67 associated with this installation will share their received signals with each BSU 69. The individual antenna 121 output are coupled to summers 145, 149 located on each respective BTM 93 of a BSU 69.

All adjustable 119 time of arrivals are summed and input into each BSU 69 yielding a signal that will have y copies of the received signal with different time delays where y is an integer. Each AAM 67 receive delay unit 119 has a different predetermined delay. Preferably, each delay unit 119 imparts a delay of at least two chips which enables further processing to achieve a net increase in signal strength.

Each CDMA communication is associated with a unique code. The AIM 99 modems allow simultaneous processing of multiple CDMA communications, each processing a communication associated with a different CDMA code.

Combining x signals with a known distortion enables the lowering of the transmit power required, increasing the number of subscribers 25 (the number of simultaneous communications) with a given base station.

Figure 8:
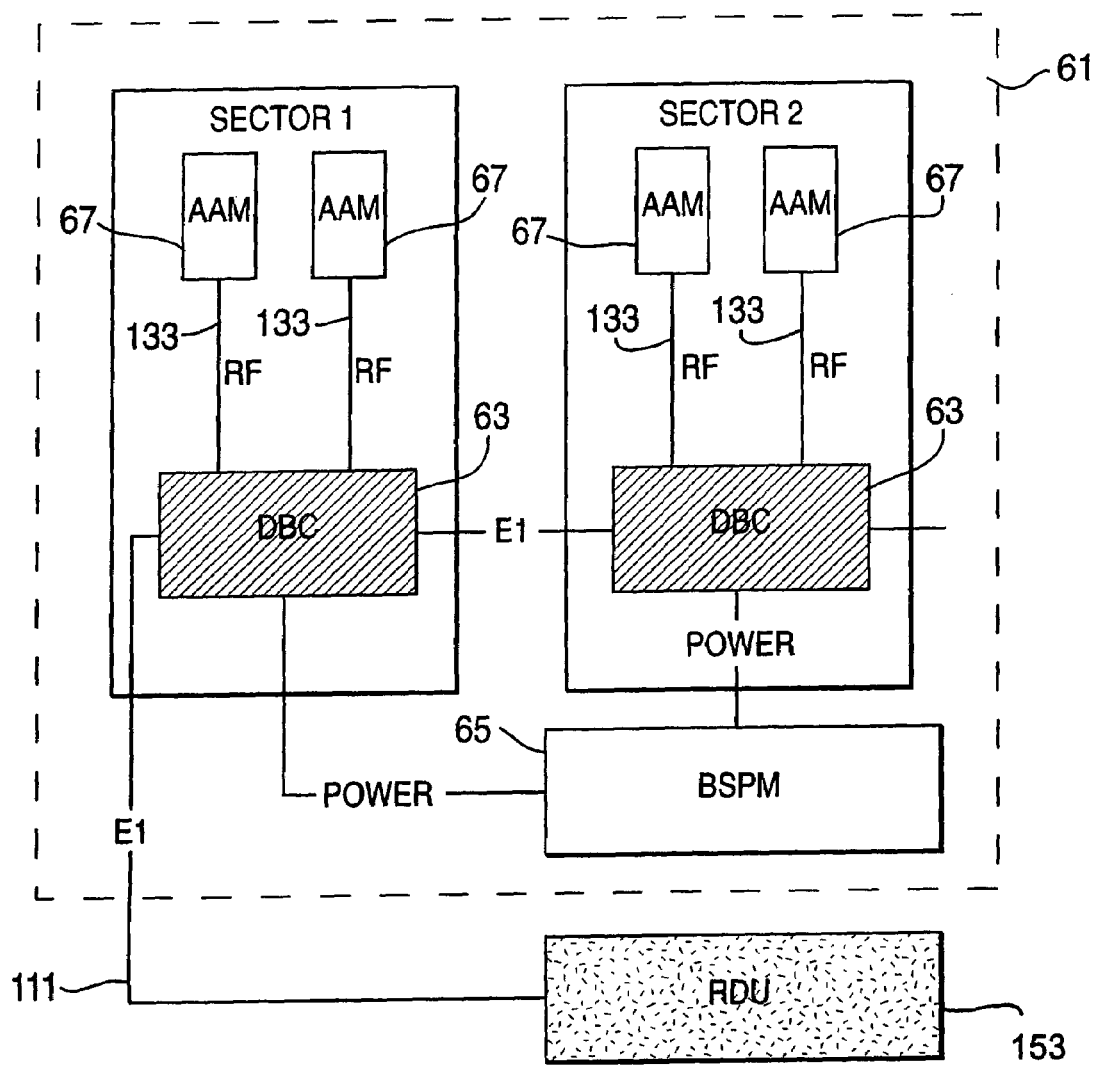
FIG. 8 is block diagram of a scalable base station using two base station units.

A cellular base station with the maximum number of BSUs in a two trunk configuration is shown in FIG. 8. A standby relationship is formed between the BSUs inside the DBCs 63 in the event of a single failure. From a radio distribution unit (RDU) 153, a single E1 line 111 carrying up to 68 PCM calls is coupled to the BSUs. The topology also eliminates single mode failures while increasing signal throughput between modules.

While the present invention has been described in terms of the preferred embodiment, other variations which are within the scope of the invention as outlined in the claims below will be apparent to those skilled in the art.

What is claimed is:

1. A bidirectional communication system using a CDMA air interface between a plurality of subscriber units communicating with a base station, the system comprising:
   a scalable base station configured from up to a select maximum number n of modular colocated base station units for supporting incremental communication capacity based on the number of modular base station units, each base station unit for communicating with a predefined number of subscriber units;
   each base station unit transmitting a unique CDMA global pilot channel signal at a full power level for a discrete limited time interval which time interval is distinct from the time intervals of all other base station units in the scalable base station configuration; and
   a plurality of subscriber units for CDMA communication with the scalable base station, each subscriber unit having means for selectively receiving global pilot channel signals from up to n modular base station units, such that reception of each global pilot channel signal is in a discrete time interval synchronized with the full power level transmission time interval of the respective global pilot channel signal which time interval is distinct from the reception of all other transmission time intervals of the global pilot channel signals.

2. The communication system according to claim 1 where n is calculated based upon a maximum desired communication capacity divided by the capacity of a single base station unit.

3. The communication system according to claim 1 wherein the scalable modular base station is configured from a selected number m of modular base station units where m<n.

4. The communication system according to claim 1 where n=6.

5. The communication system according to claim 1 wherein the time interval is determined by the time of day.

6. The communication system according to claim 1 wherein the means for selectively receiving global pilot channels includes waking up for the discrete time interval.

7. The communication system according to claim 1 wherein each modular base station unit further transmits a fast broadcast channel and a slow broadcast channel.

8. The communication system according to claim 1 wherein the means for receiving global pilot channels further includes storing a relative global pilot channel signal strength received.

9. The communication system according to claim 7 wherein the means for receiving global pilot channels further includes receiving the slow broadcast channel and the fast broadcast channel and deriving and storing that base station unit's communicating capacity from the slow and fast broadcast channels.

10. The communication system according to claim 9 wherein a subscriber unit initiates communication with one of the modular base station units by choosing from storage the modular base station unit having the strongest global pilot signal strength.

11. The communication system according to claim 10 wherein the choosing from storage further includes the communication capacity of that base station unit.

12. A base station for use in a bidirectional communication system using a CDMA air interface between a plurality of subscriber units communicating with the base station, comprising:
   a scalable base station configured from up to a select maximum number n of modular colocated base station units for supporting incremental communication capacity based on the number of modular base station units, each base station unit for communicating with a predefined maximum number of subscriber units at any given time; and
   each base station unit transmitting a unique CDMA global pilot channel at a high power level for a discrete limited time interval which time interval is distinct from the time intervals of all other base station units in the scalable base station configuration.

13. A method of providing bidirectional communication using a CDMA air interface between a plurality of subscriber units communicating with a base station, the steps comprising:
   configuring from up to a select maximum number n of modular colocated base station units a scalable base station for supporting incremental communication capacity based on the number of modular base station units, each base station unit for communicating with a predefined number of subscriber units;
   transmitting a unique CDMA global pilot channel signal from each base station unit at a full power level for a discrete limited time interval which time interval is distinct from the time intervals of all other base station units in the scalable base station configuration; and
   selectively receiving global pilot channel signals from up to n modular base station units at a plurality of subscriber units for CDMA communication with the scalable base station, such that reception of each global pilot channel signal is in a discrete time interval synchronized with the full power level transmission time interval of the respective global channel which is distinct from the reception of all others of the global pilot channel signals.

\* \* \* \* \*

UNITED STATES PATENT AND TRADEMARK OFFICE
CERTIFICATE OF CORRECTION

| | |
|---|---|
| PATENT NO. | : 6,993,001 B1 |
| APPLICATION NO. | : 09/646371 |
| DATED | : January 31, 2006 |
| INVENTOR(S) | : Polan et al. |

It is certified that error appears in the above-identified patent and that said Letters Patent is hereby corrected as shown below:

At column 3, line 17, delete the word "drawings" and insert therefor -- drawing --.

At column 3, line 23, after the word "transceivers", delete "17N, 19N, 21N, 23N." and insert therefor -- 17N', 19N', 21', 23'. --.

At column 5, lines 55, 58, 61, 63, 66, at the beginning of each line insert -- • --.

At column 6, line 1, at the beginning of the line insert -- • --.

At column 7, line 11, after the word "transmission", delete "$L_0, L_1$", and insert therefore -- $L_0, L_1$ --.

At column 7, line 13, after the word "requirement.", delete "The".

At column 7, line 20, after the word "between", delete "a" and insert therefor -- an --.

At column 8, line 14, after the word "slow,", delete "44".

At column 8, line 18, after the word "signals", delete "137".

At column 8, line 43, after "119", delete "located in".

UNITED STATES PATENT AND TRADEMARK OFFICE
CERTIFICATE OF CORRECTION

PATENT NO. : 6,993,001 B1
APPLICATION NO. : 09/646371
DATED : January 31, 2006
INVENTOR(S) : Polan et al.

Figure 7A:
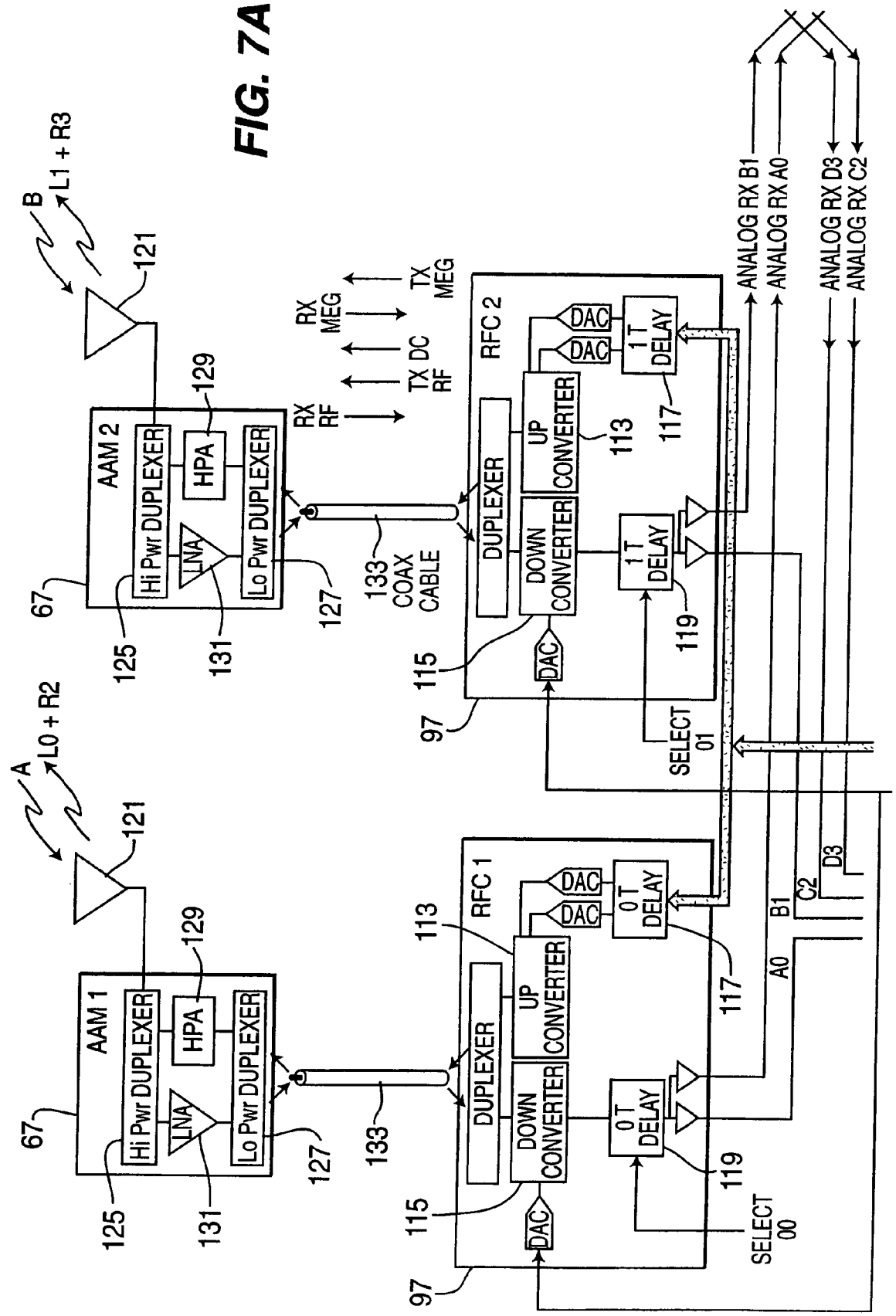
FIG. 7A is a block diagram of two amplified antenna modules and radio frequency control modules for the first base station as shown in FIG. 6.
Figure 7B:
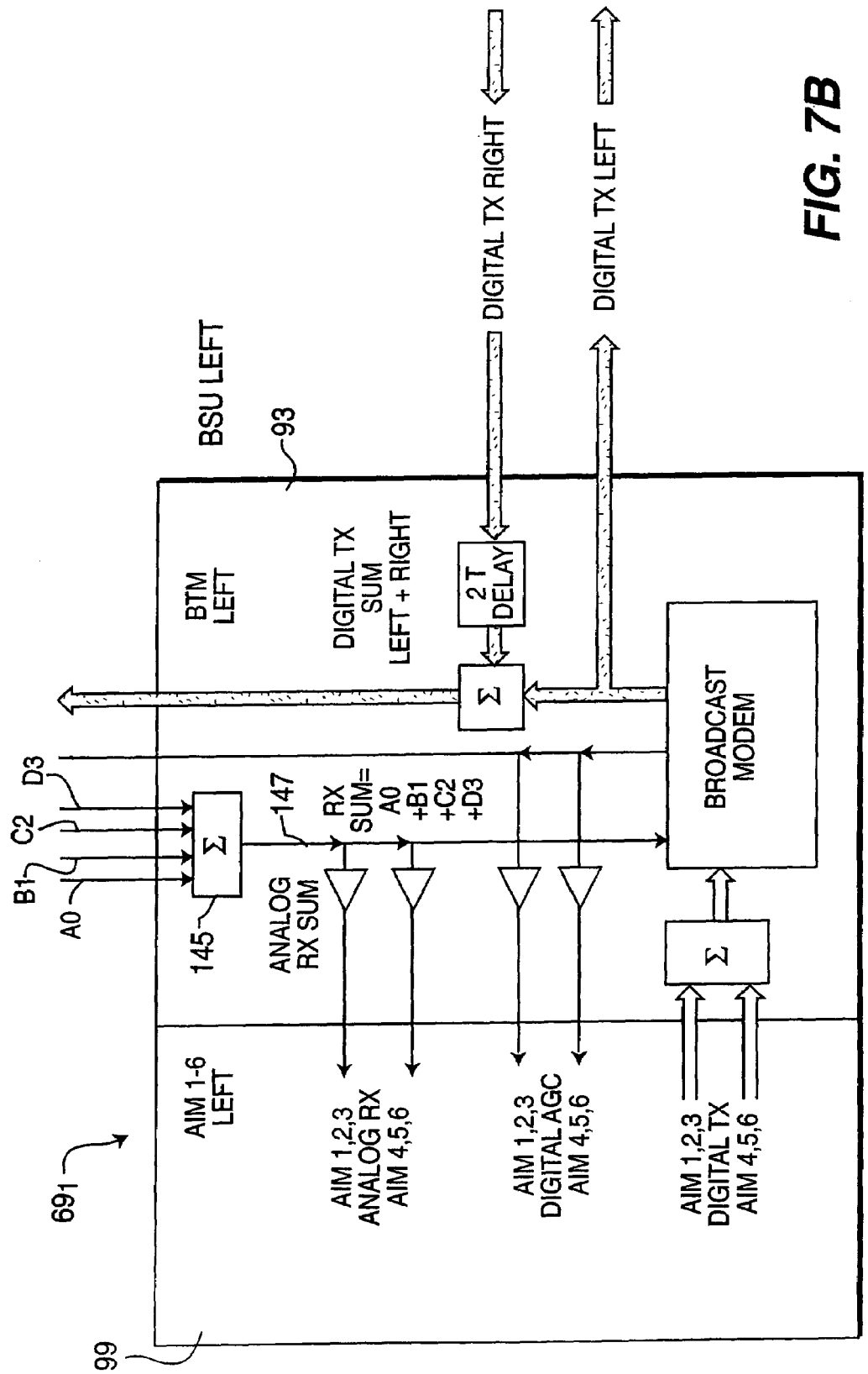
FIG. 7B is a block diagram of a baseband transceiver module and six air interface modules for the first base station unit as shown in FIG. 6.
Figure 7C:
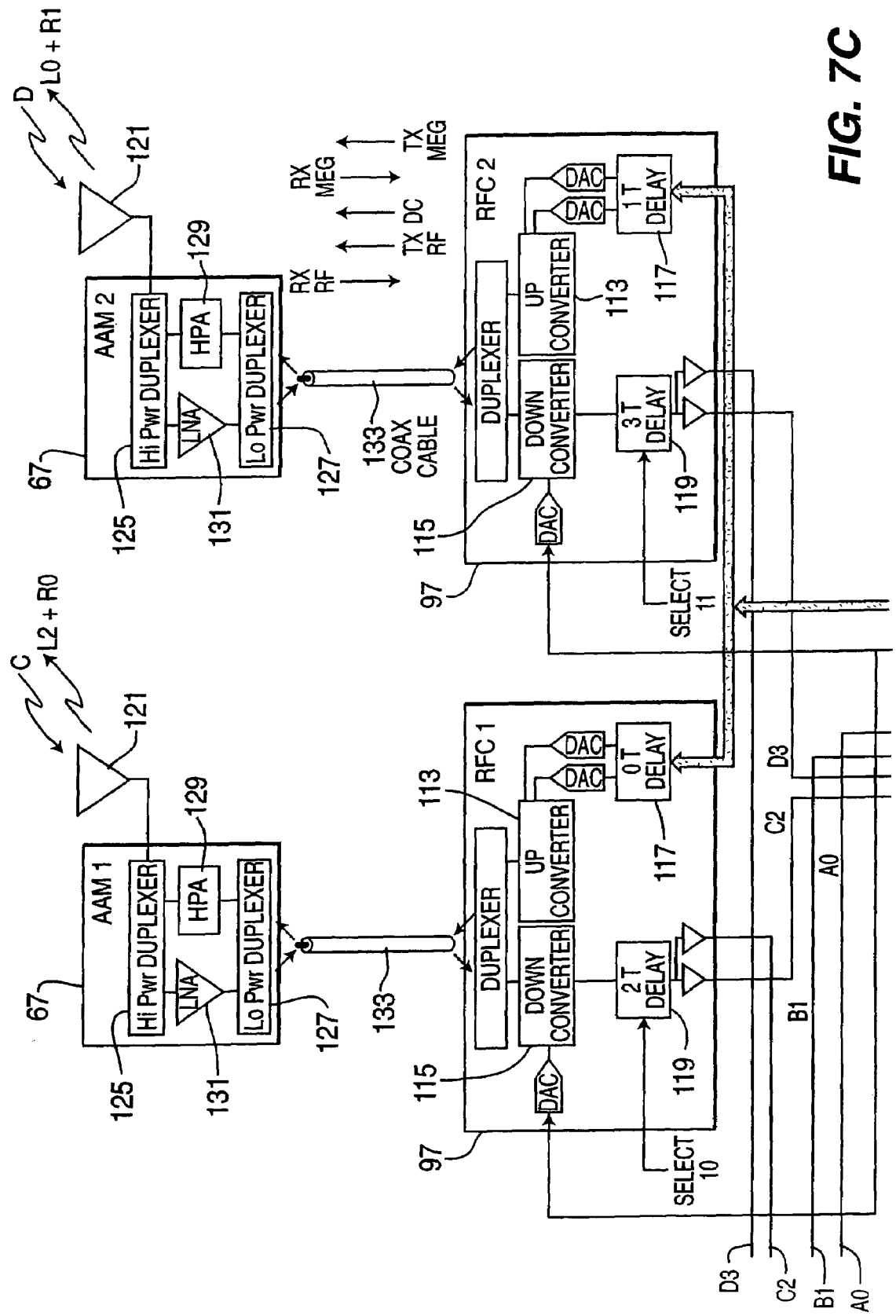
FIG. 7C is a block diagram of two amplified antenna modules and radio frequency control modules for the second base station unit as shown in FIG. 6.

It is certified that error appears in the above-identified patent and that said Letters Patent is hereby corrected as shown below:

On FIG. 7B, box 99, line 7, delete "DIGITAL AGC".

Figure 7D:
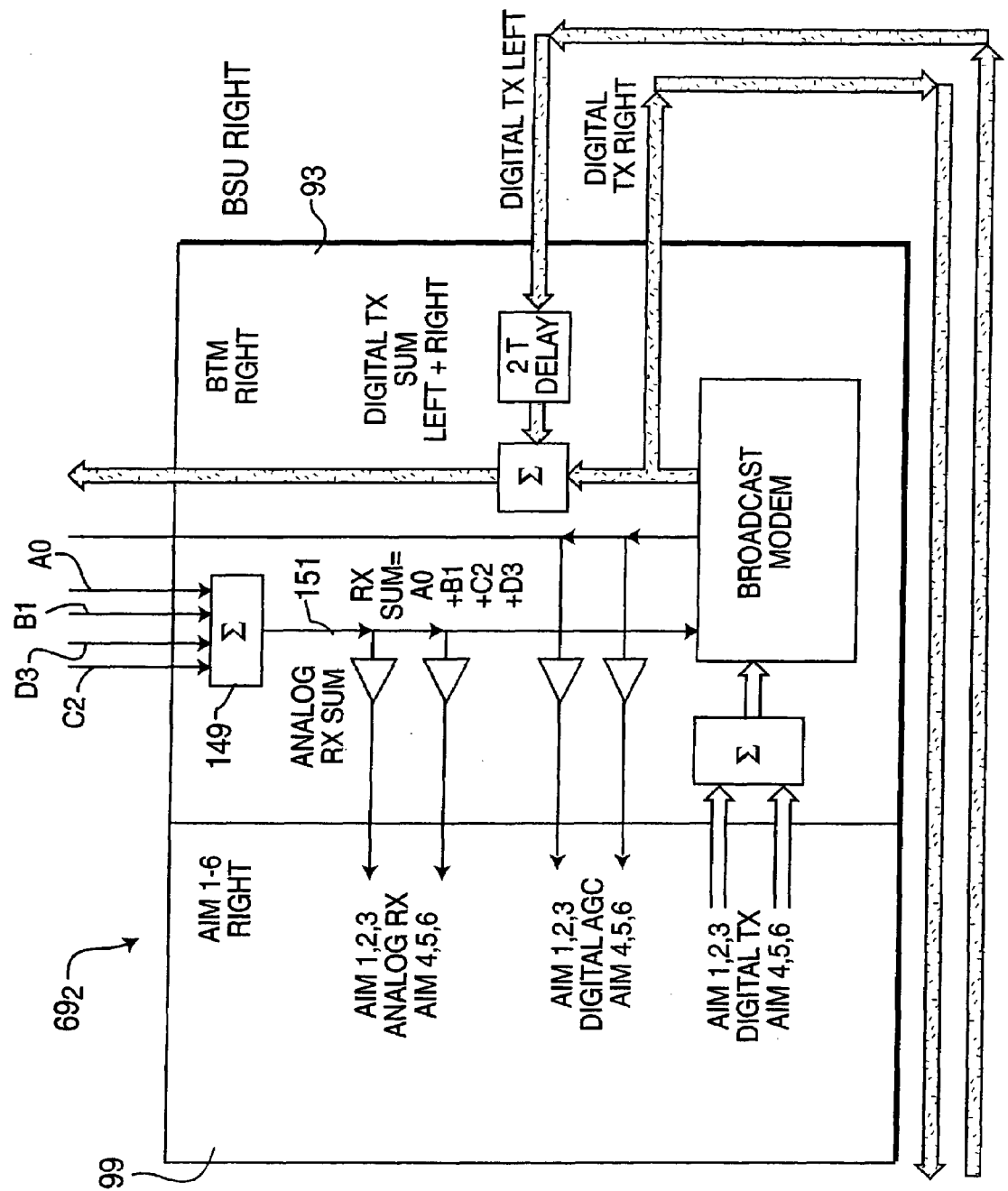
FIG. 7D is a block diagram of a baseband transceiver module and six air interface modules for the second base station unit as shown in FIG. 6.

On FIG. 7D, box 99, line 7, delete "DIGITAL AGC".

Signed and Sealed this

Seventeenth Day of October, 2006

JON W. DUDAS
*Director of the United States Patent and Trademark Office*